(No Model.) 2 Sheets—Sheet 1.

G. B. GRANT.
MACHINE FOR CUTTING SPUR AND WORM GEARS.

No. 405,030. Patented June 11, 1889.

Witnesses:
H. W. Aiken
F. Vandever Hayden

Inventor.
George B. Grant
By Tschernach
Atty (No Model.) 2 Sheets—Sheet 2.

G. B. GRANT.
MACHINE FOR CUTTING SPUR AND WORM GEARS.

No. 405,030. Patented June 11, 1889.

WITNESSES.
H. H. Aiken
F. Vandever Hayden

INVENTOR.
George B. Grant
By T. O. Teschemacher
Atty.

N. PETERS, Photo-Lithographer, Washington, D. C.

UNITED STATES PATENT OFFICE.

GEORGE B. GRANT, OF MALDEN, MASSACHUSETTS.

MACHINE FOR CUTTING SPUR AND WORM GEARS.

SPECIFICATION forming part of Letters Patent No. 405,030, dated June 11, 1889.

Application filed December 12, 1887. Serial No. 257,714. (No model.)

*To all whom it may concern:*

Be it known that I, GEORGE B. GRANT, of Malden, in the county of Middlesex and State of Massachusetts, have invented certain new and useful Improvements in Machines for Cutting the Teeth of Spur-Gears, of which the following is a specification.

My invention relates to certain improvements in machines for cutting either straight or spiral teeth of spur-gears; and it consists in certain novel mechanism to feed a spiral cutting tool or hob across the face of the gear-blank being cut while both gear-blank and cutter are revolving together; and my invention also consists in certain combinations of parts and details of construction, as hereinafter set forth, and specifically claimed.

Figure 1:
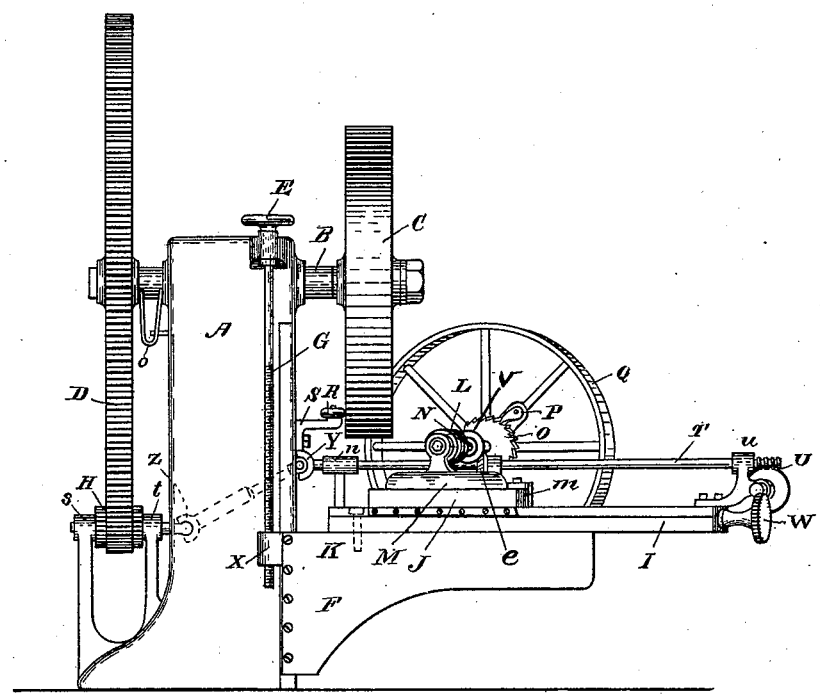
Figure 2:
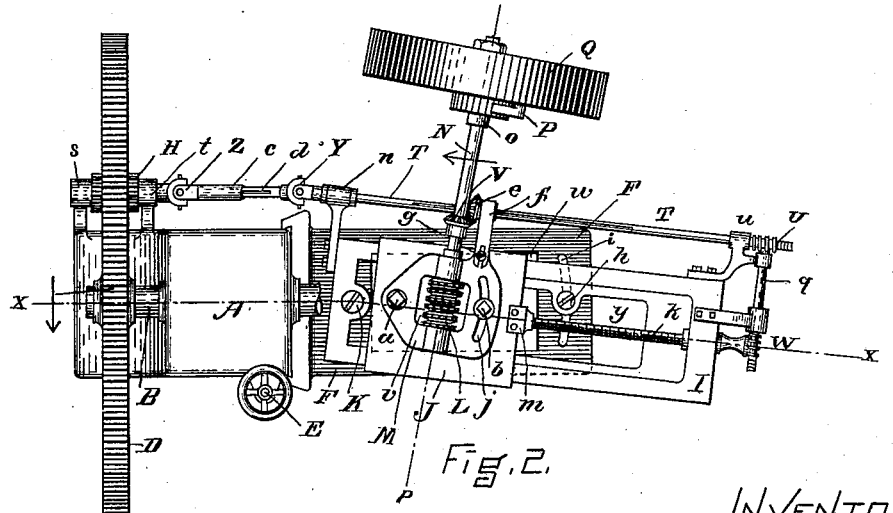
Figure 4:
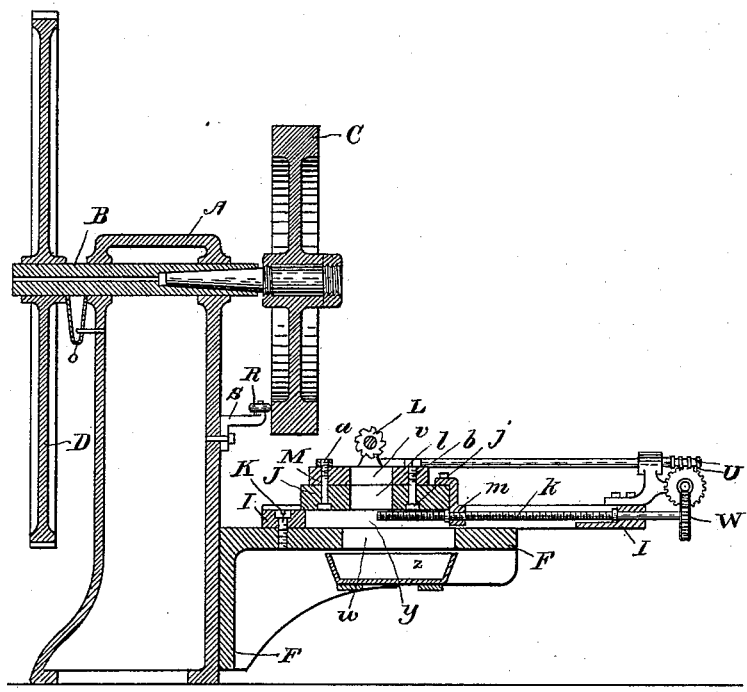
Figure 3:
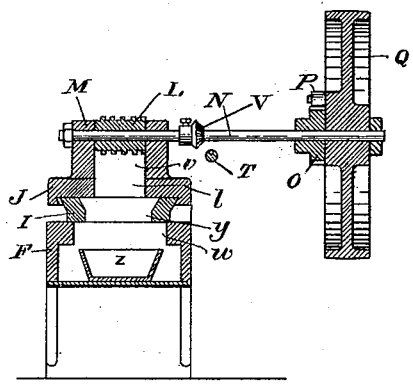

Figure 1 is a side elevation of a gear-cutting machine constructed in accordance with my invention. Fig. 2 is a plan of the same. Fig. 3 is a vertical section on the line $p\, p$ of Fig. 2. Fig. 4 is a vertical section on the line $x\, x$ of Fig. 2.

In the drawings, A represents the standard or frame which supports the machine. The horizontal gear-spindle B slides in its bearings in the standard A, in which it is free to move to a limited extent in the direction of its length. There is a strong spring $o$ between the master-wheel and the standard, serving to press back the gear-spindle B and to keep the blank C against the stop R. The object of this spring is to prevent any movement of the gear-blank when the cutter is being drawn outward, or movement from any accidental cause. It carries the master-gear D at one end and the gear-blank C to be cut at the other end. The master-gear D is revolved by the pinion H, supported in suitable bearings $s$ and $t$. The gear-blank C bears against a rest R, attached to the standard A. This rest is preferably a friction-roller mounted on a vertical stud in the bracket S, whereby the gear-blank is permitted to revolve freely while it is under pressure from the hob or cutter L. The bed F slides in vertical guides on the standard A and is moved on said standard and set in any desired position by the screw G, which works in the nut X, and is turned by the hand-wheel E. The frame I rests on the bed F and is suitably fastened on it at any small angle with the gear-spindle B, preferably by means of the bolt $h$ in the slot $i$ and the pivot-bolt K. The carriage J slides on the frame I and is traversed on it by means of the feed-screw $k$ and the nut $m$.

M is a head which is placed on the carriage J and forms a portion thereof, said head being fastened by the pivot-bolt $a$ and the bolt $b$ in the slot $j$, whereby it is made adjustable, and can be fastened in any desired position.

In suitable bearings on the head M is mounted the cutter-shaft N, carrying the cutter or hob L, the said shaft and cutter being revolved by means of the pulley Q, which is loose on the shaft N and drives it in one direction only by means of the ratchet O and the pawl P, whereby any accidental backward rotation of the cutter-shaft is prevented and injury to the cutter or gear-blank thus avoided.

T is a grooved shaft, which is secured to the frame I by means of the bracket-bearings $n$ and $u$ in such a position that it is parallel with the guides on which the carriage slides. The gear $e$ is fastened on the head M by means of a bracket-bearing $f$, secured by the screw $g$, so that it may be adjusted when the head is moved on the carriage. The gear V is fastened on the shaft N and meshes with the gear $e$. The gear $e$ carries a spline which runs in the groove in the shaft T. The shaft T, by means of two pairs of worms and gears U and W and the shaft $q$, drives the feed-screw $k$ and slowly traverses the carriage J on the frame I. The grooved shaft T also drives the pinion H, with the shaft of which it is connected by a grooved shaft $d$, sliding in a splined sleeve $c$ and the universal joints Y and Z, the grooved shaft $d$ and the splined sleeve $c$ allowing for the vertical adjustment of the bed F. By thus connecting the gear-spindle with the cutter-shaft I am enabled to communicate a positive rotary motion from the cutter-shaft to the gear-spindle, whereby the proper speed of the gear-spindle with relation to that of the cutter is at all times maintained. Furthermore, it will be seen that, on account of the described arrangement of the grooved shaft T, the positive rotary motion transmitted from the cutter-shaft to the gear-spindle is not in the least affected by the movement of the carriage while being traversed in either direction.

The cutter L on the head M, revolved by the cutter-shaft N, is a cutting-screw, usually called a "hob." It is a steel screw provided with cutting-grooves and hardened. It may have any of the forms of the ordinary hob, being either convex, for internal gears, straight, as shown, concave, like an "hour-glass worm," or of other known form. The hob is set in the machine by turning the head M on the carriage until the cutter-shaft is set at the required angle of inclination to the direction of the feed, which is the angle that is made by the spiral of the thread of the cutter with its axis.

The frame I is set on the bed F at an angle with the gear-spindle B equal to the angle of inclination of the tooth to be cut on the gear with the axis of the gear. If the common straight tooth is to be cut, the frame I is set parallel with the gear-spindle; but if the teeth are to be spiral the frame must be set at a small angle with it, as shown in Fig. 2.

If the hob has a multiple thread, the relative speed of hob and gear-blank must be changed accordingly. The speed of the teeth of a double-threaded hob is twice that of a single-threaded hob, and the speed of the blank must be doubled.

There is an aperture $v$ through the head M, directly under the cutter, and there are apertures $l$ in the carriage J, $y$ in the frame I, and $w$ in the bed F, so that there will be a clear passage for the chips to fall through from the cutter to the floor, or into a pan $z$ on a shelf within the bed F. These chip-apertures are most clearly shown in Figs. 3 and 4. The apertures $v$ and $l$, which move with the cutter, may be short, but the others $w$ and $y$ should be long enough to be under the cutter at all times. If the back rim of the blank is rough and uneven, it will still always bear against the rest R, for the spindle B will then slide in and out in its bearings, and permit the blank to bear on the rest.

The machine is described as holding the gear-blank in a fixed position while the cutter-shaft is adjustable in position and traversed across it but it would evidently be an equivalent method to fix the cutter-shaft and adjust and move the gear-blank, as is common on milling machines.

The operation of this machine is as follows: Suppose, first, that an ordinary spur-gear with straight teeth is to be cut. A hob having teeth of any desired shape and pitch is fastened on the cutter-shaft, and the shaft is set at an angle on the carriage, as described. The gears V, $e$, and H are of such sizes that the shaft will make as many revolutions to one revolution of the gear-blank C as there are teeth to be cut in the latter. The frame I is fastened on the bed F parallel with the axis of the gear-blank. The machine is then started, and while both hob and gear-blank are revolving together the hob is fed slowly across the face of the blank, one passage across the face cutting all the teeth.

If spiral teeth are to be cut, the machine is set up and operated exactly as for straight teeth, except that the frame I is then set at an angle with the gear-spindle equal to the angle of the teeth to be cut with that spindle, as shown by Fig. 2. If a second spiral gear is cut with the same cutter and at the same angle of the frame I with the gear-spindle, but in the opposite direction, the two gears will run together with their axes parallel.

The chief advantage of this method of cutting gears over the ordinary method that employs a single cutter lies in the fact that there are practically from three to six teeth of the cutter at work at the same time, as compared with one tooth by the common process, enabling the required amount of metal to be taken out of the blank in much less time. Much time is also saved by the fact that the spiral tool keeps steadily at work from the start to the finish, while the common cutter must be returned after it has cut each tooth, and kept away from the blank until it has been spaced for the next tooth.

The new method also offers the advantage that the teeth made by it are always correctly formed to the size of the gear it is cutting, while the common cutter is made to do duty not only on the size to which it has been shaped, but also on several adjacent larger and smaller sizes. It is difficult to correctly center an ordinary cutter, particularly for gears of few teeth, but the spiral cutter if straight does not need to be centered at all. One spiral cutter does duty for all sizes of gears, from the smallest to the largest, while it requires a set of separate ordinary cutters, from eight to twenty-four in number, to cover the same range. The whole machine is also simpler and more manageable than the equivalent automatic machine adapted to the use of the ordinary method.

The process or method of cutting gears in the manner herein described forms the subject of a separate application for Letters Patent filed by me in the United States Patent Office February 18, 1887, Serial No. 228,139.

What I claim as my invention, and desire to secure by Letters Patent, is—

1. In a machine for cutting gears, the combination of a spindle for holding the gear-blank, a carriage for holding the cutter-shaft, means for feeding the carriage, whereby the cutter is carried across the face of the blank, a cutter-head adjustably attached to the carriage, a cutter-shaft held by the cutter-head, and a positive connecting mechanism, whereby rotary motion is communicated from the cutter-shaft to the gear-spindle, substantially as described.

2. In a machine for cutting gears, the combination of a spindle for holding the gear-blank, a carriage for holding the cutter-shaft, means for feeding the carriage, whereby the cutter is carried across the face of the blank, a cutter-shaft adjustably secured to the carriage, whereby it may be set at an angle corresponding to that of the thread of the cutter to be employed, and a positive connecting mechanism, whereby rotary motion is communicated from the cutter-shaft to the gear-spindle, substantially as described.

3. In a machine for cutting gears, the combination of a spindle for holding the gear-blank, a carriage for holding the cutter-shaft, means for feeding the carriage, whereby the cutter is carried across the face of the blank, said carriage being made adjustable to vary the angle of its feed to the gear-spindle, a cutter-shaft adjustably secured to the carriage, whereby it may be set at an angle corresponding to that of the thread of the cutter to be used, and a positive connecting mechanism, whereby rotary motion is communicated from the cutter-shaft to the gear-spindle, substantially as described.

4. In a machine for cutting gears, the combination of a spindle for holding the gear-blank, a carriage for holding the cutter-shaft, said carriage being made adjustable to vary the angle of its speed to the gear-spindle, means for feeding the carriage, whereby the cutter is carried across the face of the blank, a cutter-head adjustably attached to the carriage, a cutter-shaft held by the cutter-head, and a positive connecting mechanism, whereby rotary motion is communicated from the cutter-shaft to the gear-spindle, substantially as described.

5. In a machine for cutting gears, the combination of a spindle for holding the gear-blank, a cutter-carriage for holding the cutter-shaft, means for feeding the carriage, whereby the cutter is carried across the face of the blank, a cutter-shaft and a spiral cutter secured on the carriage at an angle with the direction of the feed of the carriage substantially equal to the angle of the thread of the cutter with its axis, and a positive connecting mechanism, whereby rotary motion is communicated from the cutter-shaft to the gear-spindle, substantially as described.

6. In a machine for cutting gears, the combination of the frame A, the spindle B, the adjustable bed F, the frame I, adjustably secured on the bed F, the carriage J, sliding on the frame I, means for feeding the carriage on the frame I, the cutter-shaft N, adjustably secured to the carriage, and the positive connecting mechanism, whereby rotary motion is communicated from the cutter-shaft to the gear-spindle, substantially as described.

7. In a machine for cutting gears, the combination, with the gear spindle B, the cutter-shaft N, and the positive connecting mechanism, whereby rotary motion is communicated from the cutter-shaft to the gear-spindle, of the pulley Q, loosely connected with the shaft N by a ratchet and pawl, whereby the accidental rotation of the shaft in the wrong direction is prevented, substantially as described.

8. In a machine for cutting gears, the combination, with the frame-work and the horizontal spindle for holding the gear-blank having a play or movement within its bearings in the direction of its length, of the rest R, for the rear side of the gear-blank, substantially as described.

9. In a machine for cutting gears, the combination, with the frame-work and the horizontal spindle for holding the gear-blank having a play or movement within its bearings in the direction of its length, of the rest R, for the rear side of the blank, and the spring o, whereby the blank is pressed against the rest, substantially as described.

10. In a machine for cutting gears, the combination, with the cutter-shaft N, of the carriage J and bed F, arranged under the cutter-shaft for the purpose of supporting and operating the same and having appertures arranged substantially one above the other and under the cutter-shaft, whereby a clear passage is formed through which the chips may fall from the cutter, substantially as described.

11. In a machine for cutting gears, the combination, with the cutter-shaft N, of the sliding carriage J and the fixed bed F, an aperture in the carriage substantially under the cutter-shaft, and a long aperture in the fixed bed substantially under the aperture in the carriage, whereby a clear passage is formed through which the chips may fall from the cutter, substantially as described.

Witness my hand this 9th day of December, A. D. 1887.

GEO. B. GRANT.

In presence of—
P. E. TESCHEMACHER,
H. W. AIKEN.